United States Patent

[11] 3,574,315

| [72] | Inventor | Ace C. Boultinghouse<br>Northridge, Calif. |
|---|---|---|
| [21] | Appl. No. | 773,123 |
| [22] | Filed | Nov. 4, 1968 |
| [45] | Patented | Apr. 13, 1971 |
| [73] | Assignee | B & E Products Inc.<br>Los Angeles, Calif. |

[54] ADJUSTABLE MITRE SAW
4 Claims, 6 Drawing Figs.

[52] U.S. Cl. .................................................... 143/6,
143/46
[51] Int. Cl. ..................................................... B27b 5/20
[50] Field of Search........................................... 143/6,
6—46, 6—47, 6—43, 46; 83/490, 581

[56] References Cited
UNITED STATES PATENTS

| 1,481,569 | 1/1924 | Tannewitz..................... | 143/6 |
| 2,911,017 | 11/1959 | Holder .......................... | 143/6 |
| 3,026,917 | 3/1962 | Schwartz....................... | 143/46X |
| 3,195,591 | 7/1965 | Haberman..................... | 143/6 |

*Primary Examiner*—Donald R. Schran
*Attorney*—Beehler & Arant

ABSTRACT: A power-driven saw is described which performs mitre cuts and which is adjustable to the angle of cut desired. A turntable is included in which the power-driven saw is pivotally mounted thereto by a spindle. A counterbalance arm is pivoted above a work support and is capable of clearing the saw from the work being cut. A brake shoe is mounted on the work support which can be engaged to press upon a circular flange mounted on the turntable for locking the saw at a desired angle.

INVENTOR.
ACE C. BOULTINGHOUSE
By Beehler & Arant
Attorneys.

INVENTOR.
ACE C. BOULTINGHOUSE
By Beehler & Arant
ATTORNEYS.

INVENTOR.
ACE C. BOULTINGHOUSE
By Boehler & Grant
ATTORNEYS.

ADJUSTABLE MITRE SAW

This invention relates to a power saw and more particularly to a novel and improved, pivotally counterbalanced saw which is capable of providing a wide range of angular cuts.

Heretofore, power-driven saws were used for mitre cuts which included counterbalanced, overhead saw blades. These saws are operated by a single handle which is used to clear the saw from the material being cut. The handle is pivoted to a base and connected to a carriage by linkage. The carriage is pivoted above the base and the first pivot, and has a saw and motor mounted thereon. By raising the handle the counterbalanced saw and motor are raised clear of the material, and by lowering the counterbalance handle the saw would be positioned back to its proper cutting position. Such a device in its operation is explained more particularly in U.S. Pat. No. 3,026,917.

Such prior art devices lack the ability to cut in any desired angle and in fact are limited to the certain angular cuts as provided by angular locking mechanisms therein, which provide only for specific cutting positions. Thus, it can be seen that these prior art devices are limited to their angle of cut.

It therefore becomes one object of this invention to provide a novel and improved adjustable mitre saw.

Another object of this invention is to provide a novel and improved mitre saw which is capable of making mitre cuts at any desired angle.

Another object of this invention is to provide a novel and improved mitre saw which can be easily and quickly adjusted to a desired angular cut.

With these and other objects in view, the invention consists in the construction, arrangement, and combination of the various parts of the device, whereby the objects contemplated are attained, as hereinafter set forth, pointed out in the appended claims and illustrated in the accompanying drawings:

Briefly described, the present invention comprises a worktable mounted to a support base and an overhead counterbalanced saw mechanism. The saw mechanism and carriage therefore are connected to a turntable which is rotatably mounted to a shaft and which allows rotational movement of the saw and carriage to accommodate various angles of cuts of material placed on the worktable. A circular flange is disposed for rotation with the turntable. An index plate is provided to indicate the angle of the cut being made and also includes indentations therein. A locking mechanism is provided for locking the turntable to desired and predetermined angular positions. A brakeshoe is provided which is operable by a hand lever for setting an angular position of the turntable, saw, and carriage for any desired angular cut.

DESCRIPTION OF THE CHOSEN EMBODIMENT

Figure 1:
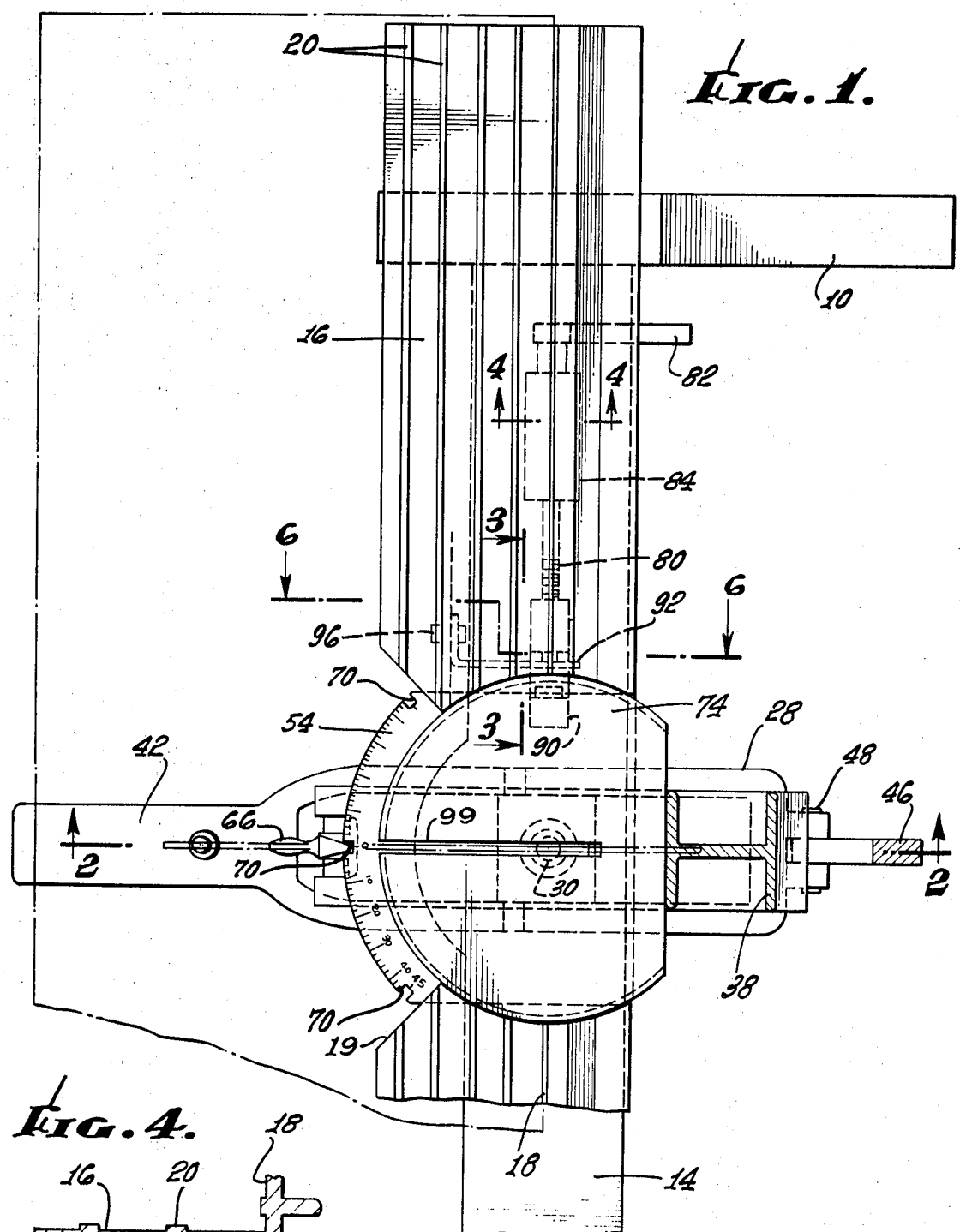
FIG. 1 is a top elevation view of the mitre saw, in accordance with the principles of this invention, and taken along the lines 1-1 of FIG. 2.
Figure 2:
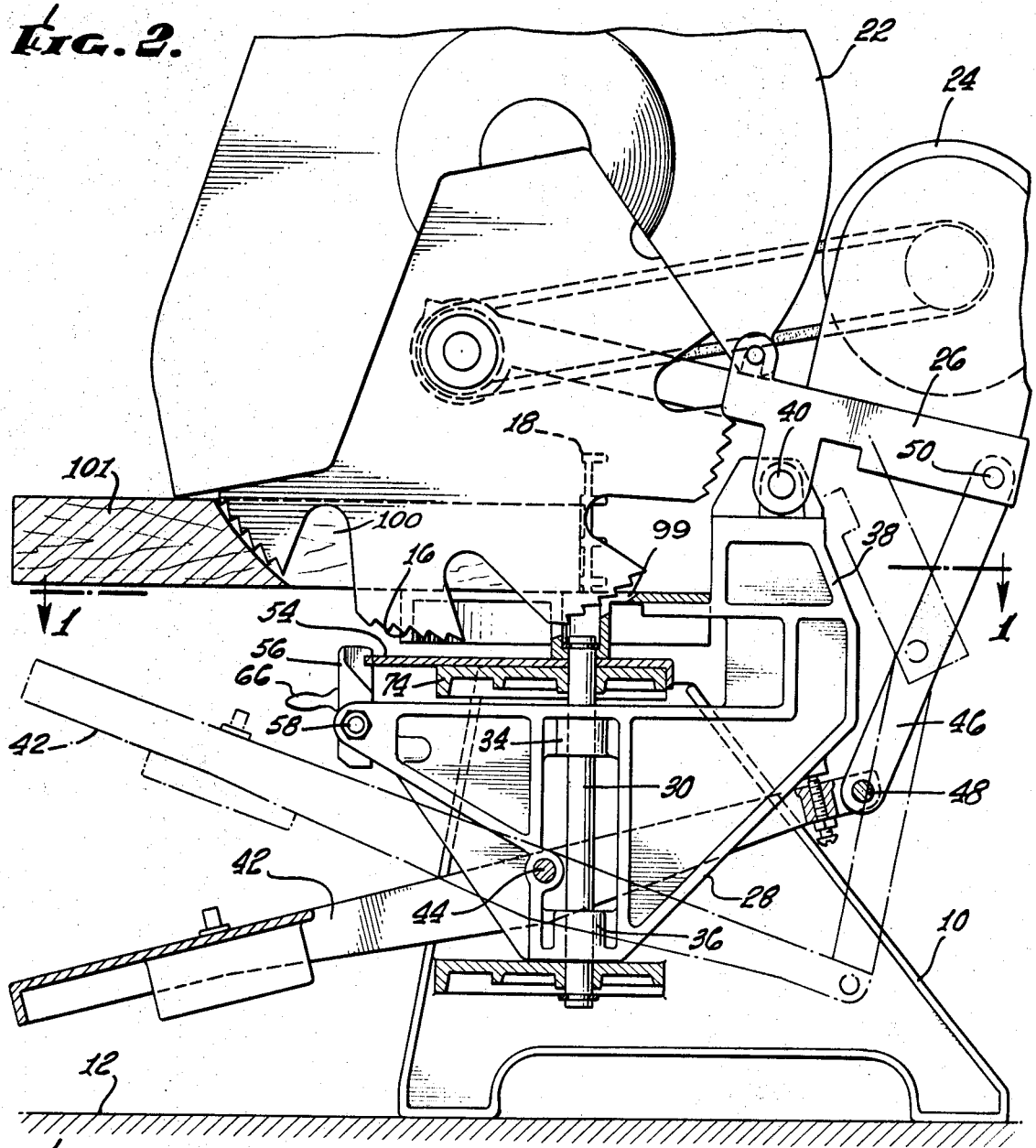
FIG. 2 is a section view taken along the lines 2-2 of FIG. 1 and illustrates the turntable and carriage arrangement in accordance with the principles of this invention.

In a more detailed description of one embodiment of this invention, there is shown in FIGS. 1 and 2 a pair of vertically spaced supports 10 which may be the type which rest on a workbench 12 or other suitable surface. The supports 10 include a pair of spaced parallel crossmembers 14 and 15, longitudinally supported between the supports 10. A worktable 16 is mounted to the top of the top crossmember 14 in a suitable manner. The worktable 16 includes a backstop 18 mounted perpendicular to the surface of the worktable 16 and has a wide V-shaped slot 19 therein for the saw blade to fit into, as will be explained. The worktable 16 and the backstop 18 have a plurality of serrations 20 suitably spaced along the surfaces thereof to provide ease in the movement of materials placed on the worktable 16 and against the backstop 18.

A saw 22 and a motor 24 are mounted to a carriage 26 and suspended in an overhead position. By overhead position is meant a position wherein the saw and a saw blade 22 are suspended above the material being cut. A turntable 28 is rotatably mounted by vertically positioned shaft 30 between the crossmembers 14 and 15. A pair of bearings 34 and 36 is employed to mount the shaft 30 to the turntable 28. The turntable 28 includes an upwardly extending portion 38 to which the carriage 26 is pivotally mounted by a pivot 40. An operating handle 42 is pivotally mounted by a pivot 44 to the turntable 28. A linkage 46 is connected between one end of pivotally mounted handle 42 and one end of the carriage 26 at the pivots 48 and 50, respectively. By movement of the handle 42 in a vertical position, similar motion is imparted through the linkage 46 to the carriage 26. By positioning the motor 24 on the carriage 26 at a position rearwardly of the pivot 40 and near the linkage 46, a counterbalance affect is provided for ease in manipulation of the handle 42. Such counterbalance movement is explained in U.S. Pat. No. 3,026,917 as previously mentioned.

Figure 5:
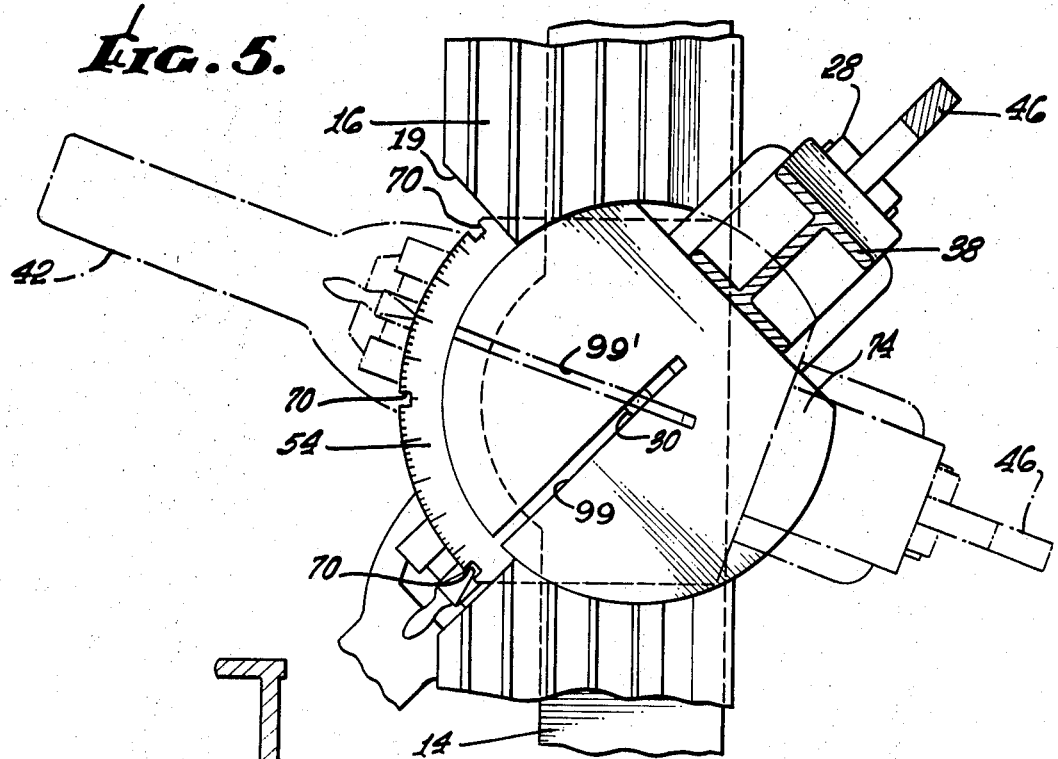
FIG. 5 is a top plan view of the worktable and turntable arrangement.
Figure 6:
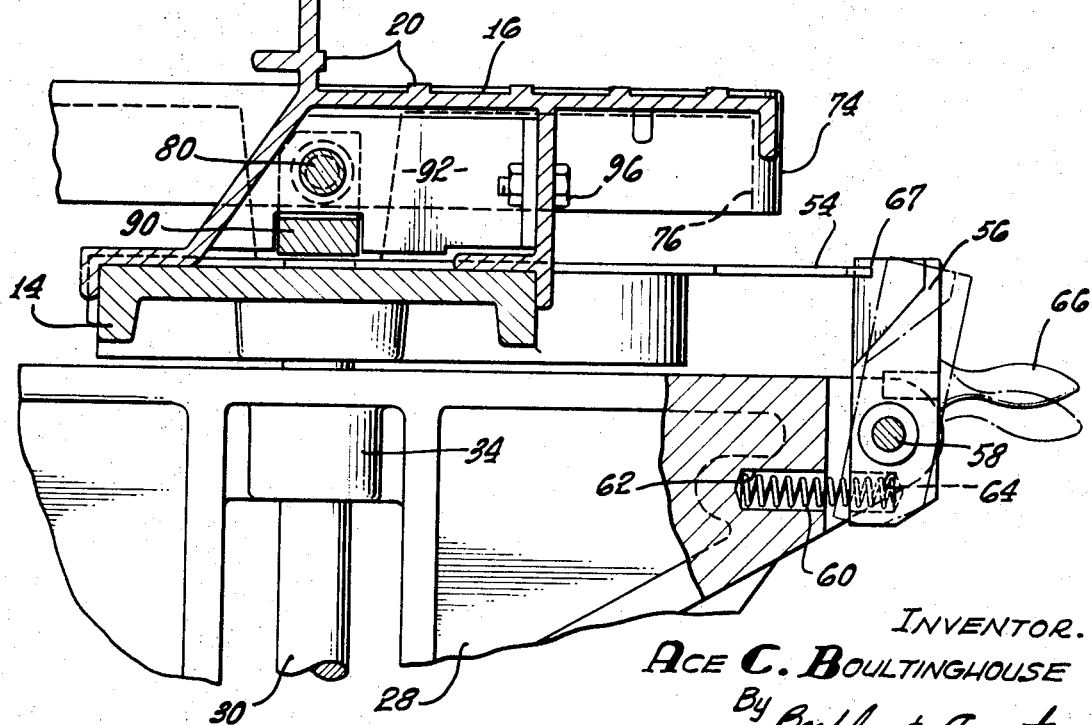
FIG. 6 is a section view taken along the lines 6-6 of FIG. 1 and further illustrates the locking brakeshoe arrangements.

As previously mentioned, the turntable 28 is transversely rotatable. Thus, by movement of the handle 42 the turntable 28 rotates on the shaft 30. An index plate 54 is provided and is firmly affixed to the crossmembers 14. As shown in FIGS. 1 and 5, the index plate 54 includes a plurality of index settings and various indentations 70 at predetermined angles. By this embodiment the angles are set at 0° and 45° in either direction. A spring loaded, locking mechanism 56 is pivotally mounted by the pivots 58 to the turntable 28. A spring 60 is positioned in a bore 62 in the turntable 28 and a matching bore 64 in the locking mechanism 56. A handle 66 extends from the locking mechanism 56 and substantially between the pivot 58 and the upper portion of the locking mechanism 56. The upper portion of the locking mechanism 56 includes a latch 67 which engages the various indentations or slots 70 positioned in the index plate 54. By manipulation of the handle 66, the locking latch 67 can be engaged and disengaged into the slots 70 provided in the index plate 54.

In accordance with the principles of this invention a circular flange 74 is rotatably mounted to the shaft 30. A downwardly depending ridge 75 is provided about the circumferential edge of the flange 74. The ridge 75 has an inner surface 76 which acts as a braking surface to be hereinafter described.

Figure 4:
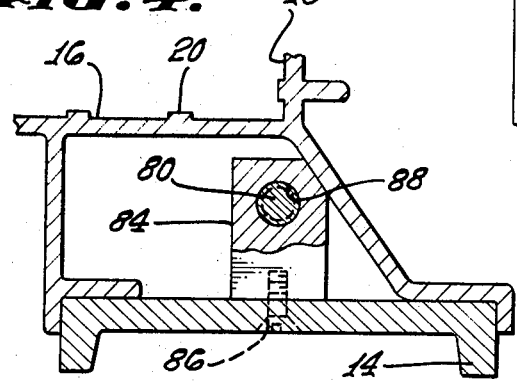
FIG. 4 is a section view taken along the lines 4-4 of FIG. 1 and illustrates the mounting apparatus for the locking mechanism.
Figure 3:
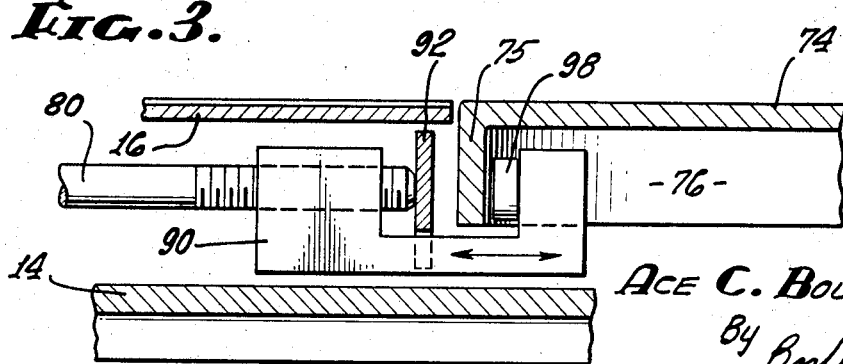
FIG. 3 is a partial section view taken along lines 3-3 of FIG. 1 illustrating the locking mechanism of the turntable and carriage arrangement.

Braking apparatus is provided to secure the turntable 28 in a position not provided for by slots 70 in the index plate 54. With reference to FIGS. 1, 3, and 4, there is shown a setscrew 80 operable by a handle 82 connected thereto. A mount block 84 is secured to the worktable support 14 in a suitable manner, as for example the screw 86, shown in FIG. 4. A hole 88 is provided in the mount block 84 for a portion of the setscrew 80 to extend therethrough. The handle 82 may extend beyond the worktable support 14 to provide easy access thereto. Threadably mounted on the setscrew 80 is a brake shoe support 90 which is substantially U-shaped and has one end threadably mounted on the setscrew 80 and the other end extending into the inner surface 76 of flange 74. Apparatus in the form of the angle extending member 92 is permanently secured to the crossmember 14, as shown in FIG. 1, by the nut and bolt 96 for the setscrew 80 to bear upon and prevent longitudinal movement thereof. A brakeshoe 98 is secured to one of the inner U-shaped surfaces of the brakeshoe support 90. When the handle 82 is moved in a predetermined direction, the shoe support mount 90 moves in a predetermined direction on the setscrew 80 and positions the brakeshoe 98 on the inner surface 76 of the turntable 74, thereby locking the turntable 28 and its supported saw 22 in a permanent positioning. By unloosening the setscrew 80, the turntable 28 is free to rotate on the shaft 30.

In the turntable 74 is a slot 99 which is in alignement alignment with the saw blade 22' and the wide V-shaped slot 19 in the worktable the slot 19 being wide enough to accommodate the saw blade throughout the entire swing in a horizontal plane to all of its positions. The slot 99, being in the turntable 74 swings with the turntable as it is rotated to one or another of its positions, 99' for example, and the saw blade 22' can pass through it in any position as it cuts a cerf 100 in a piece of lumber 101.

Thus, there has been described a mitre saw which is capable of adjustment to any desired position over a wide range of angles and not merely limited to the positioning slotted settings as provided by the index plate 54. Further, the apparatus includes an easy and secure locking mechanism for locking the saw at the desired angles.

I claim:
1. An adjustable mitre saw comprising:
a pair of vertically spaced supports;
a pair of spaced parallel crossmembers mounted between said spaced supports;
a turntable rotatably mounted between said crossmembers and having an upwardly extending member;
a lever pivotally attached to said turntable;
a carriage pivotally attached to an upper portion of the upwardly extending member of said turntable, said carriage being adapted to hold a circular power saw and a motor in a counterbalanced pivotal position;
a connecting link pivotally connecting one end of said carriage to one end of said lever;
means mounted on one of said spaced parallel crossmembers for releasably holding said turntable in any desired angular position;
a circular flange horizontally positioned for rotation with said turntable, said flange having a ridge extending around the circumferential edge of said flange, said ridge having an inner surface;
a U-shaped member adapted to surround the ridge of said flange;
a shoe mounted on one of the inner sides of said U-shaped member and being adapted to engage the inner surface of the ridge of said flange;
means mounted on the upper crossmember of said pair of crossmembers for imparting transfer movement of said U-shaped member and said shoe into releasable engagement with the inner surface of the ridge of said flange;
a threaded mount block secured to the upper crossmember of said pair of crossmembers;
a threaded screw engaging said threaded mount block and said U-shaped member being threadably mounted to said screw; and
a stationary flange fixedly mounted to said upper crossmember of said pair, said threaded screw being in abutment with said stationary flange.

2. An adjustable mitre saw comprising:
a support means;
a pair of spaced parallel crossmembers mounted on said support means;
a turntable rotatably mounted between said crossmembers and having an upwardly extending member;
a lever pivotally attached to said turntable;
a carriage pivotally attached to an upper portion of the upwardly extending member of said turntable, said carriage being adapted to hold a circular power saw blade and a motor in a counterbalanced pivotal position;
a connecting link pivotally connecting one end of said carriage to one end of said lever;
means mounted on one of said spaced parallel crossmembers for releasably holding said turntable in any desired angular position; and
a horizontal surface element on said turntable, a worktable on said support means in parallel relationship with said turntable, said horizontal surface element having a relatively narrow slot therein adapted to swing in a horizontal plane with said turntable between opposite limits of movement, said worktable having a relatively wide slot therein in vertical alignment with said relatively narrow slot at all positions of said turntable.

3. An adjustable mitre saw as in claim 2 wherein upper surfaces respectively of said horizontal surface element and said worktable are in the same horizontal plane.

4. An adjustable mitre saw as in claim 2 wherein the worktable has a vertical backstop and the vertical axis of rotation of said turntable is substantially in vertical alignment with said backstop.